United States Patent [19]

Sharan

[11] Patent Number: 5,603,746
[45] Date of Patent: Feb. 18, 1997

[54] METHOD AND APPARATUS TO DETERMINE AND CONTROL THE CARBON CONTENT OF STEEL IN A BOF VESSEL

[75] Inventor: Alok Sharan, Allentown, Pa.

[73] Assignee: Bethlehem Steel Corporation

[21] Appl. No.: 550,590

[22] Filed: Oct. 31, 1995

[51] Int. Cl.$^6$ ................................................. C21C 5/30
[52] U.S. Cl. .......................... 75/375; 250/554; 266/78; 266/80; 266/99; 356/72
[58] Field of Search ................................ 75/375; 266/78, 266/80, 99; 356/72; 250/554

[56] References Cited

U.S. PATENT DOCUMENTS

| | | | |
|---|---|---|---|
| 2,207,309 | 7/1940 | Work | 75/60 |
| 2,354,400 | 7/1944 | Percy | 75/60 |
| 2,803,987 | 8/1957 | Galey | 88/14 |
| 2,807,537 | 9/1957 | Murphy | 75/60 |
| 3,591,296 | 7/1968 | Kunioka et al. | 266/99 |
| 3,652,262 | 3/1972 | Denis | 75/60 |
| 3,669,645 | 6/1972 | Oishi et al. | 75/60 |
| 3,720,404 | 3/1973 | Carlson et al. | 266/34 |
| 3,741,557 | 6/1973 | Harbaugh et al. | 266/35 |
| 4,651,976 | 3/1987 | Arima et al. | 75/375 |

FOREIGN PATENT DOCUMENTS

| | | | |
|---|---|---|---|
| 2015788 | 10/1970 | Germany | 75/375 |
| 1183281 | 3/1970 | United Kingdom | 75/375 |

OTHER PUBLICATIONS

BOF Control, by J. H. Cox, et al.; BOF Steelmaking, pp. 243–288 vol. 4, 1997.

*Primary Examiner*—Melvyn Andrews
*Attorney, Agent, or Firm*—Harold I. Masteller

[57] ABSTRACT

Apparatus for determining in-blow % carbon content and/or the First Turn Down Carbon of a BOF heat includes a light sensor housed within a temperature regulated case having a sighting window including air wipe means to shield the light sensor from steelmaking dust and fume. The apparatus also includes a means to generate a signal that corresponds to the amount of oxygen blown into the BOF during a heat, and a programmable logic controller. The logic controller is programmed to continuously process oxygen blown signals from the signal generating means, and light intensity signals received from the light sensor. The program calculates continuous in-blow % carbon content of the heat based upon the difference in light intensity from a point of maximum light intensity emitted from the BOF vessel in relation to the amount of oxygen blown into the BOF vessel during the same period of time.

28 Claims, 5 Drawing Sheets

FTDC = 0.053%

METHOD AND APPARATUS TO DETERMINE AND CONTROL THE CARBON CONTENT OF STEEL IN A BOF VESSEL

BACKGROUND OF THE INVENTION

This invention is directed to a method and apparatus for controlling or determining the carbon content of a heat in a BOF vessel, and more particularly, to a method for determining the in-blow carbon content and the First Turn Down Carbon (FTDC), in low carbon steel BOF heats containing 0.06% or less carbon.

Users of flat rolled steel product demand low carbon grade steel because of its good formability properties. For example, in the automotive industry, such low carbon steel permits auto manufacturers to stamp and form complex automobile shapes without encountering steel spring-back after the foraging operations. This makes it necessary for steelmakers to accurately manage and control the carbon content of their BOF heats to produce a product having the proper metallurgical requirements.

In the BOF steelmaking process carbon saturated liquid iron is poured into the vessel along with various amounts of steel scrap. High velocity oxygen is blown into the BOF vessel at the surface of the molten steel bath where it reacts with the carbon to form CO and $CO_2$. This reaction removes excess carbon in the steel bath and produces a finished product having the desired carbon content.

There are many BOF process control methods available to present day steelmakers. These controls range from sophisticated predictive models that are managed through the use of computers in combination with sensor instruments such as gas analyzers, thermocouples, load cells, etc.

In the past, various attempts have been made to control the carbon content in a vessel using flame drop measurements. One such past attempt is shown in U.S. Pat. No. 3,652,262 granted to Denis. This patent discloses using a sensor to detect infrared radiation emitted from a BOF vessel. The signal from the infrared sensor is processed to generate a curve representing a function of radiation intensity against time. In his patent, Denis compared his radiation curve with a decarburization curve generated by using readings taken from a first gas pickup used to measure the concentration of $CO_2$ and CO in the off-gas of a BOF vessel, and from a second gas pickup used to measure the total gas output. He then compared the two curves and concluded that his time/radiation curve was useful in providing an instantaneous carbon reading during BOF steelmaking operations. However, if the two different graphs are compared, it can be seen that wide variations in predicted carbon levels occur between the off-gas curve and the radiation curve. Therefore, although Denis has provided some improvement in providing an instantaneous reading of carbon content during a heat, his patent shows a wide margin of error in his predicted carbon levels based upon his flame drop readings.

Additionally, in a study found in chapter fifteen entitled "BOF Control", of an Iron & Steel Society publication "BOF STEELMAKING" dated 1977, J. H. Cox, et al. teach that flame intensity is a function of the carbon in the bath. However, the authors also teach that carbon predictions, based upon flame intensity measurements, are not satisfactory for the more stringent present day needs.

Such beliefs have become widespread throughout the steelmaking industry. They have led steelmakers to use control strategies based on statistical, predictive-adaptive control models, or highly sophisticated control systems based on a continuous or periodic measurement of variables such as carbon, temperature, etc. (J. H. Cox, et al. "BOF STEELMAKING"). One such measurement process is based upon mass/temperature calculations to determine the carbon content of a BOF heat. It is well known that such mass/temperature calculations contain a margin of error, and they often lead to either overblowing or underblowing the BOF heats.

In instances where a heat is overblown various undesirable chemical reactions take place within the vessel. For example, in an overblown heat, the oxygen consumes an excessive amount of carbon and a steel product having an undesirable low carbon level is produced. The excess oxygen also reacts with the molten iron to form iron oxides. This reduces the iron yield of a heat. Overblowing a heat will also overheat the steelmaking vessel, cause premature wear on its protective refractory lining, and reduce the service life of the vessel.

In those instances where a heat is underblown, the heat may have to be reblown to further reduce the carbon level. This increases production time and cost, and causes excess refractory wear. The excess refractory wear is due to the iron oxides that are formed in the slag during the reblow. Iron oxides in the slag make the slag more corrosive to the refractory lining.

Another problem encountered with BOF control systems is dealing with the hostile environment adjacent the hot BOF vessel. The radiant heat emitted from a BOF vessel during the steelmaking process overheats sensitive electronic equipment located near the vessel and causes system failures. Dust and fume released from the vessel also settles on equipment located throughout the steelmaking shop, including the various sensor devices used to control the steelmaking process. The dust and fume causes control equipment sensors to become fouled and dirty, and results in poor readings and inaccurate metallurgical analysis.

SUMMARY OF THE INVENTION

It is therefore an object of this invention to provide a method for determining the carbon content of a BOF heat.

It is still a further object of this invention to accurately control or determine the carbon content of a BOF heat within a margin of error of about 0.004% C.

It is still a further object of this invention to accurately control or determine the carbon content of a BOF heat by measuring a difference in visible light intensity emitted from the BOF vessel in relation to the amount of oxygen blown into the vessel.

It is still a further object of this invention to provide apparatus for controlling and/or determining carbon content of a BOF heat, the apparatus being resistant to high temperatures encountered in the steelmaking process.

And finally, it is still a further object of this invention to provide apparatus, for controlling and/or determining the carbon content of a BOF heat, that includes a self cleaning means to prevent an accumulation of fume or dust on its sensor devices.

We have discovered that the foregoing objects can be attained by measuring a drop in visible light intensity emitted from a BOF vessel with a light sensor housed within a temperature regulated case having a sighting window including air wipe means to shield the light sensor from steelmaking dust and fume. The drop in visible light intensity is measured from a point of maximum light intensity emitted from the BOF vessel in relation to the amount of oxygen blown into the BOF vessel from such point of maximum light intensity, to the end of the oxygen blow. The light intensity and oxygen readings are used to compute continuous, real time in-blow % carbon levels until an aim carbon content is reached for the heat.

DETAILED DESCRIPTION OF THE PREFERRED EMBODIMENT

Figure 1:
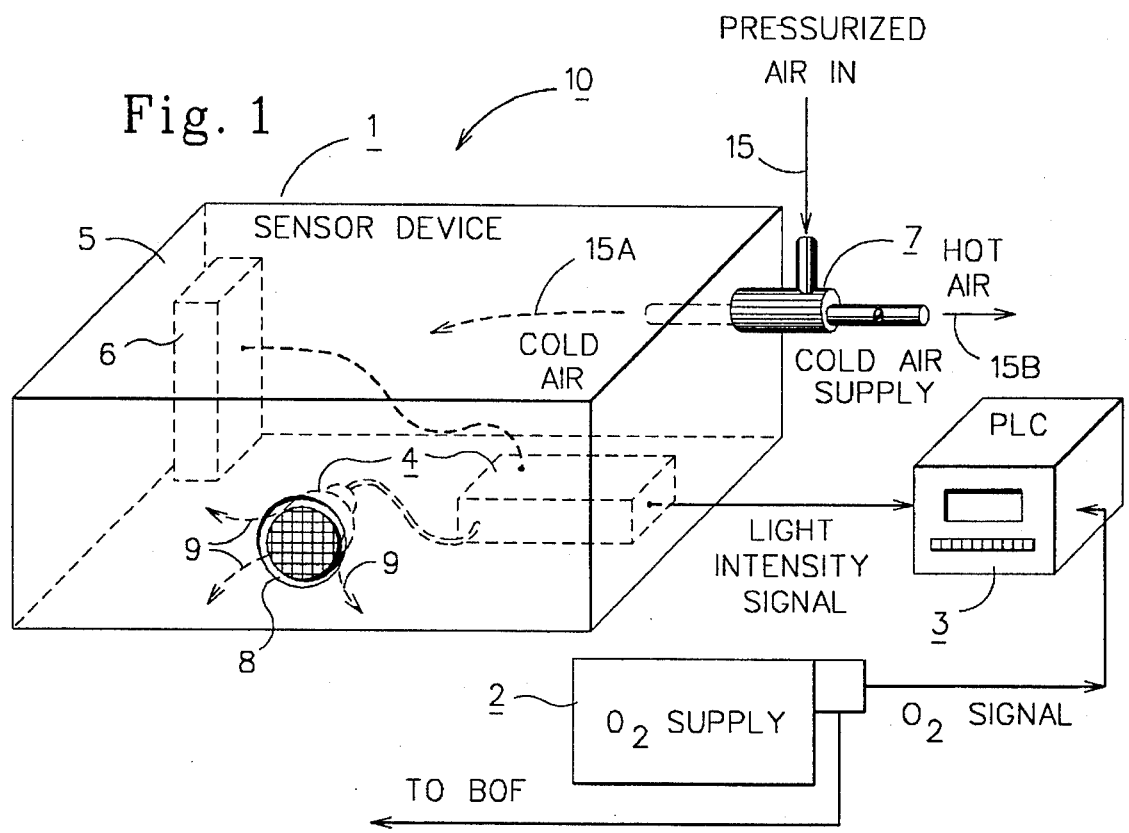
FIG. 1 is a schematic view showing the preferred system used to carry out the steps of the method to determine carbon content of a BOF heat.

Referring to the drawings, FIG. 1 shows the preferred embodiment of the sensor system 10 for carrying out the steps of the method to determine in-blow % carbon content and FTDC levels of BOF heats. Throughout this specification, "in-blow carbon content" shall mean realtime carbon levels determined at any point during an oxygen blow, and "FTDC" shall mean First Turn Down Carbon determined at the end of the first oxygen blow into a BOF.

The system comprises a sensor device 1, an oxygen source 2, and a Programmable Logic Controller 3, (PLC). The sensor device 1 comprises a case or housing 5 to hold various electronic components of the sensor device including a light meter 4 having means to amplify light intensity signals to a level suitable for use in the PLC, a power supply 6, and a cold air supply 7 to prevent the hot steelmaking environment from overheating the sensor device. The sensor device further includes a sighting window 8 that extends through a wall of the case 5 to expose the light meter 4 to visible light emitted from the mouth of the BOF vessel. An air wipe 9 emanates from the open sighting window 8 to prevent dust and fume from entering the interior space of the case. The air wipe 9 encircles the light sensitive portion of the light meter 4 and shields it from the steelmaking dust and fume.

The sensor device is designed to generate light intensity signals when it is exposed to light emitted from the mouth of the BOF vessel, and the signals are sent to the PLC for processing. Likewise, the oxygen source 2 includes means to generate signals that correspond to the amount of oxygen blown during the heat, and these signals are also sent to the PLC for processing. The light intensity signals and the oxygen blown signals provide data to continuously calculate in-blow % carbon content of the heat during the oxygen blow. The PLC receives and processes the light and oxygen signals to provide a continuous in-blow % carbon content reading in real time based upon the drop in visible light intensity in relation to the amount of oxygen blown, hereinafter referred to as "the flame drop method." In-blow % carbon content predictions based upon the flame drop method are found to contain an error of prediction of about 0.004% carbon.

Figure 2:
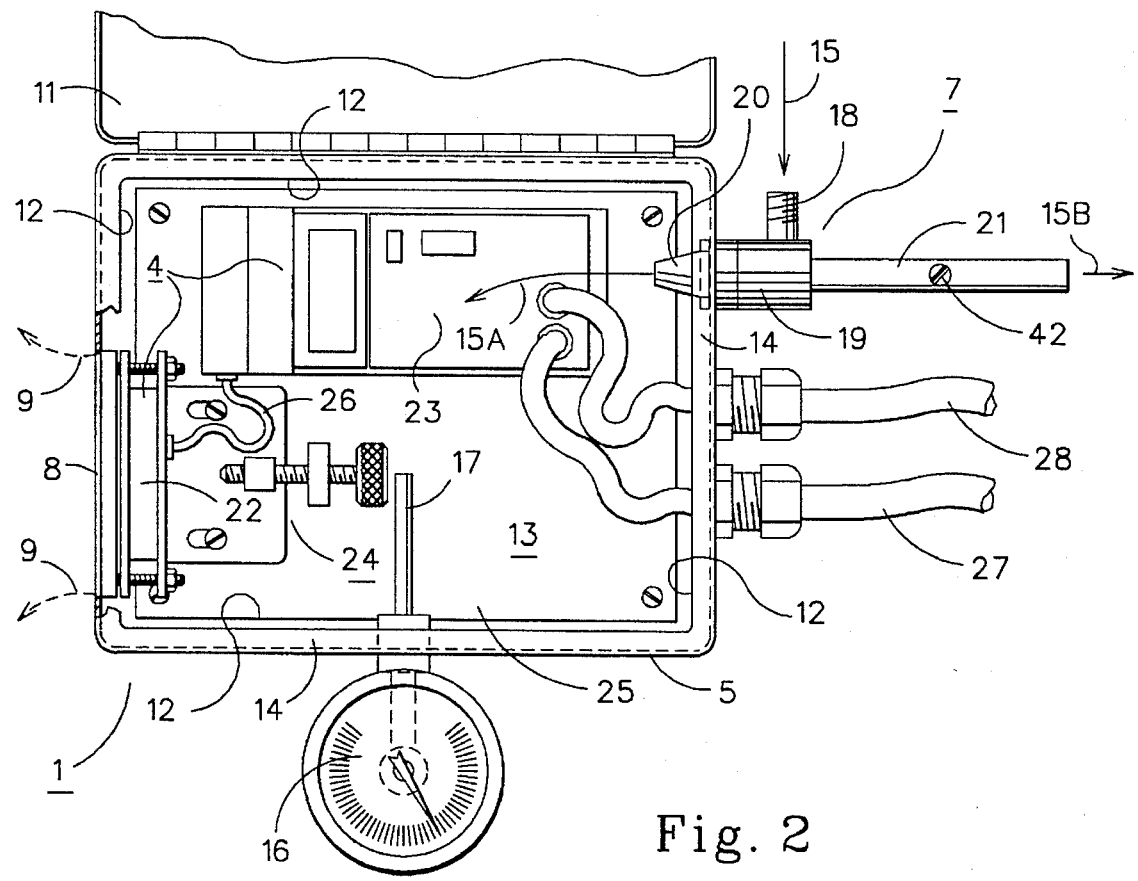
FIG. 2 is an elevation view of the preferred embodiment of the light sensor shown in the preferred system of FIG. 1.
Figure 3:
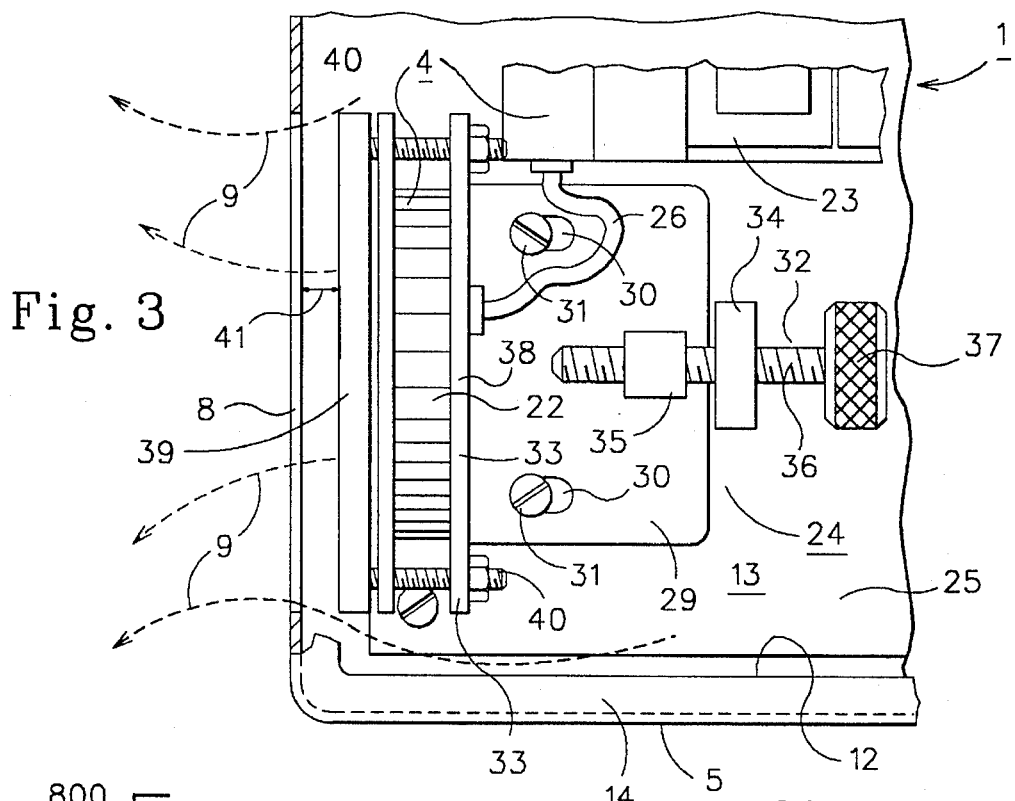
FIG. 3 is an enlarged view showing a portion of the light sensor of FIG. 2.

Referring now to FIGS. 2 and 3 of the drawings, the preferred embodiment of the sensor device 1 is shown comprising a case 5 having a hinged lid 11 to provide an opening 12 for access to the interior space 13 of case 5. A gasket or seal 14 extends along the periphery of the opening 12, and the gasket cooperates with hinged lid 11 to prevent dust or fume from entering the interior space 13 when the lid 11 is in its closed position. A cold air supply 7, shown as a vortex tube in the preferred embodiment, extends through a wall of the case to inject cold air 15A into the interior space 13. The cold air cools the interior space 13. A thermometer 16 is also attached to a wall of case 5. The thermometer includes a temperature probe 17 that extends into interior space 13 to provide an inside space temperature reading on the thermometer. The inside temperature reading is used to control the interior temperature of the case by regulating the cold air supply 7.

In the preferred embodiment, the cold air supply is shown comprising a vortex tube cooler. However any known air conditioning device, having means to regulate temperature, may be used to supply cold air to the interior space 13. The vortex tube 7 comprises an air inlet 18 through which pressurized air 15 is introduced into a vortex chamber 19 comprising a cold air vent 20 that injects cold air 15A into the interior space 13, and an exhaust tube 21 for venting hot air exhaust 15B to the atmosphere. The vortex tube further includes a valve mechanism having a valve screw 42 that extends through a wall of the exhaust tube 21 to regulate the temperature of the cold air 15A being injected into the interior space 13. The temperature of the cold air is either increased or decreased by turning the valve screw 42 in either a clockwise or counter clockwise direction. This decreases or increases the flow of the hot air exhaust and in turn either raises or lowers the temperature of the cold air 15A.

The light meter 4 is housed within the interior space 13 of case 5. In the preferred embodiment, a model P401025 Davis Instruments light meter is used. However, any suitable light meter capable of measuring the visible light intensity emitted from the mouth of a BOF vessel may be used with the sensor apparatus 1. The Davis light meter has a selenium photo-voltaic cell 22 separate from its amplifying circuit 23. This light meter arrangement makes it possible to independently mount the light sensitive cell 22 and the amplifying circuit 23 within case 5. The light sensitive cell 22 is attached to a slidable adjustment 24, and the amplifying circuit 23 to a fixed non-conductive mounting board 25 that is attached to a wall of the case. An electrical wire 26 connects the photo-voltaic cell 22 to the amplifying circuit 23, and the amplifying circuit increases the level of the light intensity signals received from the flow of electrons that respond to visible light falling on photo-voltaic cell 22. A power source (not shown) supplies power to the light meter 4 through line 27, and the amplified electrical signals from the light meter are transmitted through line 28 to the PLC shown in FIG. 1. The power supply may be either internal as shown by reference number 6 in FIG. 1, or external as shown by the outside power line 27 in FIG. 2.

Referring to the enlarged FIG. 3, the slidable adjustment 24 includes a mounting plate 29, a clamp arrangement 33 attached to a first end of the mounting plate, and a screw mechanism 32 attached to a second end of the mounting plate opposite the clamp arrangement 33. The mounting plate 29 also includes elongated slots 30. A Pin or fastener 31, having one end fixed to the mounting board 25, extends through each slot 30 to slidably attach the mounting plate 29 to the non-conductive mounting board 25.

The screw mechanism includes a first threaded boss 34 attached to the non-conductive mounting board 25, and a second threaded boss 35 attached to the mounting plate 29. A threaded shaft 36, having an adjustment knob 37 located at one end thereof extends through the threads of the first and second boss. The threaded shaft 36 provides a force to move the mounting plate 29 within the limits of engagement between the elongated slots 30 and pins 31 when shaft 36 is rotated in either a clockwise or counter clockwise direction.

The clamp arrangement 33 is located opposite the screw mechanism 32 and includes a back plate 38 attached to mounting plate 29 and positioned in a direction parallel to the sighting window 8. Clamp 33 also includes a transparent front plate 39 positioned adjacent the sighting window 8 and attached to the back plate by fasteners 40. The photo-voltaic cell 22 is positioned between plates 38 and 39, and the fasteners are tightened to clamp cell 22 between the two plates and hold it in place, adjacent and parallel to the sighting window 8.

The cold air 15A, injected into the interior space 13 from the cold air vent 20, provides a cold air flow throughout the interior of case 5. The cold air How travels in a direction toward the open sighting window 8 and cools the electronic components housed within the case. The cold air encircles the photo-voltaic cell 22 positioned adjacent the open sighting window 8, and it exits through the window to provide an air wipe 9. The air wipe 9 prevents dirt, dust and fume from entering the interior space 13 through the sighting window 8 and thereby maintains the transparent plate 39, and the light sensitive surface of the photo-voltaic cell 22, in a clean condition. It should be understood, however, that although the air wipe is described as encircling the photo cell 22, the apparatus is not limited to a photo cell having a disk shape configuration. The shape of the photo cell is not important to the scope of this invention, and it may comprise any suitable shape such as a square, rectangle, etc., and still be considered encircled by the air wipe 9.

If it is observed that the photo cell is becoming contaminated by steelmaking dust and fume, the screw mechanism 32 may be rotated to move the photo cell in a direction toward the sighting window. This will reduce the air gap 41 and increase the velocity of the air wipe 9. The screw mechanism is rotated until the air wipe velocity is increased to a level that prevents dust and fume from contaminating the light sensitive surface of the photo-voltaic cell 22. Similarly, if it is discovered that less air wipe velocity is needed to maintain the light sensor in a clean condition, the screw mechanism may be rotated in the opposite direction to increase the air gap 41 and reduce the velocity of the air wipe.

Visible observations of the flame emitted from the mouth of steelmaking vessels have long been used to estimate the FTDC of steelmaking heats. Such control methods were commonly used with the Bessemer converters, and in some instances, such flame observations have been used in BOF steelmaking operations. However, it appears that the flame drop control methods of the past have failed to recognize the correlation between a drop in light intensity measured from a point of maximum light intensity emitted from the BOF vessel, and the amount of oxygen blown into the BOF vessel from the point of maximum light intensity to the end of the oxygen blow.

It is well known that carbon dissolved in the liquid iron reacts with the oxygen that is blown into the BOF vessel. The reaction forms CO and $CO_2$ in the off-gas of the steelmaking vessel. In the early part of an oxygen blow the incoming oxygen generates far more carbon monoxide than carbon dioxide, and therefore, CO makes tip a large part of the vessel off-gas. The CO in the off-gas post-combusts at the mouth of the vessel and creates a flame. Near the end of the blow, when the molten bath has been converted to steel and the bath contains much lower carbon levels, the carbon-oxygen reaction generates much less CO in the off-gas. At this point, because there is little CO in the off-gas, the post-combustion flame at the mouth of the vessel decreases to a somewhat constant low level light intensity.

In an effort to correlate the drop in flame intensity with the amount of oxygen blown and with the FTDC of BOF heats, light intensities (LI) for more than 300 BOF heats were measured as a function of SCF of oxygen blown. It was found that the FTDC for these observed heats correlated with the $DO_2$, DLI/ILI and $DO_2$kink variables listed below.

| | |
|---|---|
| Delta Oxygen ($DO_2$) = | Amount of oxygen blown, in SCF, from a point of maximum LI to the end of the oxygen blow. |
| Degree of Flame Drop (DLI/ILI) = | A ratio between a decrease in light intensity (DLI) at any point in time between the maximum LI and the end of the oxygen blow, and an increase in light intensity (ILI) from the start of the oxygen blow to a point of maximum LI. |
| Delta Oxygen ($DO_2$kink) = | The amount of oxygen blown, in SCF, from a "kink" in LI measurements to the end of the oxygen blow. |

The FTDC variables were then correlated through statistical regression analyses to develop an FTDC equation that could be used to determine the in-blow % carbon content for any low carbon heat. This was done by first defining the $DO_2$, DLI/ILI and $DO_2$kink variables as follows to simplify the calculations:

X1=$DO_2$/100,000,

X2=DLI/ILI, and

X3=$DO_2$kink/10,000.

The laboratory analysis for each FTDC of the analyzed heats was identified with its measured variables X1, X2 and X3 as shown by the example in the following Table A.

TABLE A

| Heat - FTDC | X1 | X2 | X3 |
|---|---|---|---|
| 1. 0.032 | 1.206 | 1.057 | 2.990 |
| 2. 0.021 | 1.412 | 1.297 | 1.250 |
| 3. 0.043 | 0.580 | 0.722 | 0.000 |
| ⋮ | ⋮ | ⋮ | ⋮ |
| 299. 0.028 | 1.142 | 1.149 | 0.951 |
| 300. 0.056 | 0.173 | 0.354 | 0.000 |

It should be pointed out that although the above TABLE A lists actual values determined during the numerous heat observations, the values shown in TABLE A are not necessarily listed in their actual heat number order. Also, as indicated above, the X2 variable is a ratio between the two LI quantities, (DLI/ILI) and is a measurement of the degree of flame drop in a BOF. The LI values used in this work are expressed in arbitrary units. Because X2 is only a ratio between two LI quantities, the units in which LI is measured have no effect in characterizing the intensity of the flame. As long as the units of LI measurement are consistent, any unit of measurement, either arbitrary or absolute, may be used to measure the LI of the flame emitted from the BOF vessel.

Knowing the actual measured values for X1, X2 and X3 variables, and also knowing the actual FTDC for each heat, determined by laboratory analysis, the following equation was developed and the values of "a" through "k" were calculated for each heat.

Equation 1

$$FTDC = a + bX1 + cX1^2 + dX1^3 + eX2 + fX2^2 + gX2^3 + hX1X2 + iX1X2^2 + jX1^2X2 + k\sqrt{X3}$$

As heretofore stated, the FTDC variables were correlated through statistical regression analyses to develop an FTDC equation to determine the in-blow % carbon content for any low carbon heat. This was done by first defining the X1, X2 and X3 variables as disclosed above. The values for FTDC, X1, $X1^2$, $X1^3$, X2, $X2^2$, $X2^3$, X1X2, $X1X2^2$, $X1^2X2$ and the squareroot of X3 for the heats 1 through 300 were then listed in separate columns on a Microsoft Excel Worksheet. The linear regression program provided with MicroSoft Excel was run with FTDC being the dependent variable and the values of X1 through the squareroot of X3 being the independent variables. The program output specifies the values of the coefficients "a" through "k". For example, the value of "a" is the same as the "Intercept", (the value of "a" is the same as FTDC when X1, X2 and X3 are equal to zero). The value for "b" is the same as the coefficient for the variable X1, "c" is the same as the coefficient for $X1^2$, and so on, through to the last value showing "k" the same as the coefficient for the squareroot of X3. An example of a completed FTDC equation showing actual calculated "a" through "k" values for the observed heats is shown below.

Equation 2

$$FTDC = 0.09993125 + 0.03013298(X1) - 0.0587246(X1^2) - 0.0266337(X1^3) - 0.0879685(X2) - 0.0666153(X2^2) + 0.12504982(X2^3) + 0.10246922(X1X2) - 0.2269549(X1X2^2) + 0.14953375(X1^2X2) - 0.0003159(\text{Squareroot of } X3)$$

The calculated values for the coefficients "a" through "k" vary from BOF to BOF. In general, their values are dependent upon shop conditions and the type of BOF vessel observed. Some vessels emit more visible light than others due to such conditions as skull build up at the mouth of the vessel and the physical features of the vessel design. The "a" through "k" values may also depend upon the location of the light meter with respect to the BOF. Therefore, it can be seen that it is necessary to determine the values of "a" through "k" for each BOF vessel before % carbon is determined using the flame-drop method.

Figure 7:
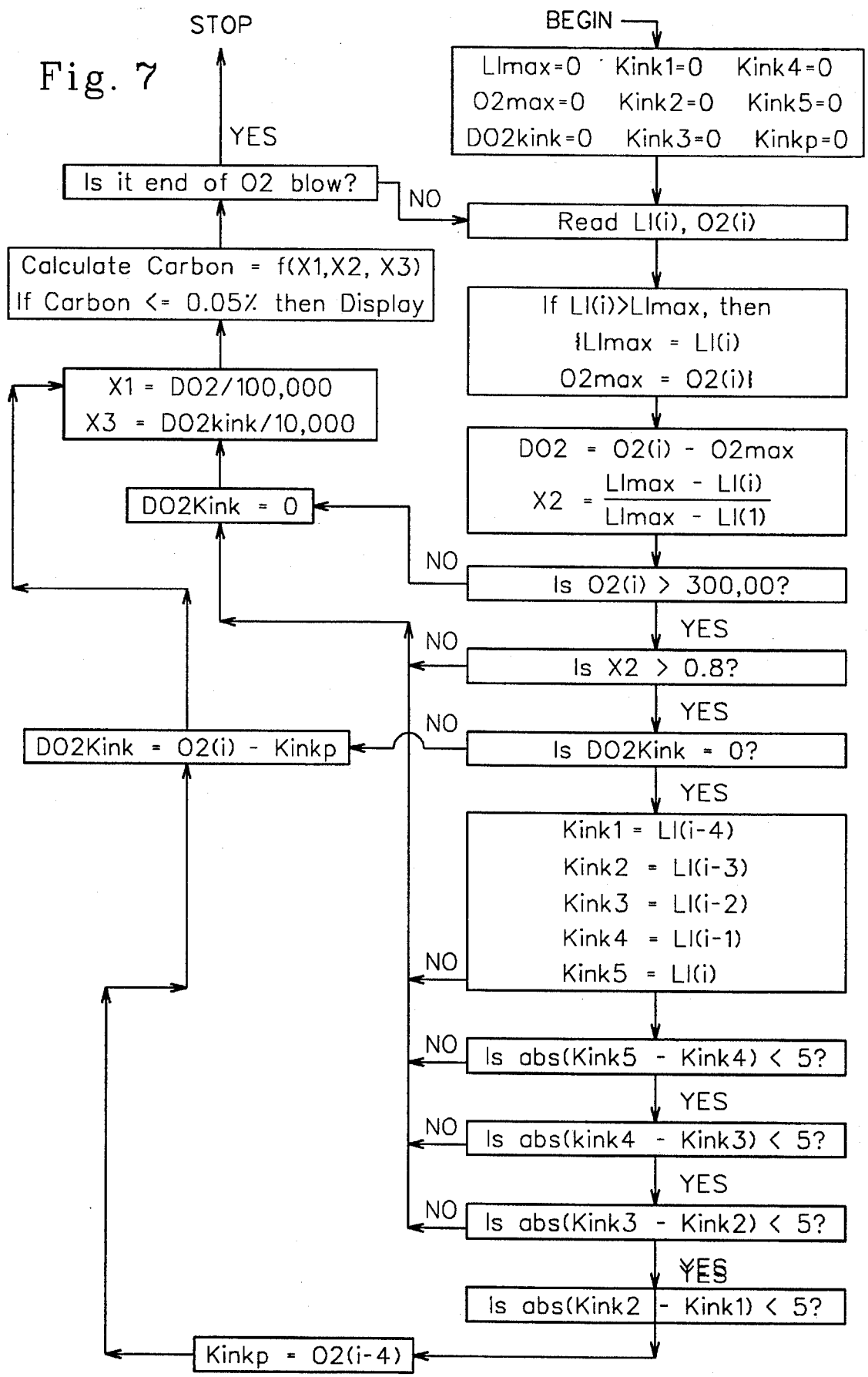
FIG. 7 is a flow chart of one program that may be used to determine in-blow carbon content and FTDC based upon flame drop measurements and oxygen blown.

The calculated coefficient values "a" through "k" are entered into a program that is written based upon the program diagram shown in FIG. 7. Code for one such possible program is attached herewith as Appendix A. It should be understood, however, that the attached code in Appendix A is only one example of many such codes that can be written following the program diagram shown in the drawings. Based upon the calculated values for "a" through "k", and also based upon real time measurements of the variables X1, X2 and X3, the program shown in FIG. 7 calculates real time % carbon using the FTDC equation.

It is important to realize that the form of the FTDC equation is not important. The equation is only a means to carry out the steps of the invention for determining % carbon based upon the flame-drop method. A polynomial equation is one way to describe the variation of FTDC with variables X1, X2 and X3. However, other forms of equations involving logarithmic, exponential, higher order polynomial terms or a combination of any of these terms may be used for carbon prediction. Neural Network programs may also be used to predict carbon for this purpose.

After the FTDC equation and program shown in FIG. 7 were developed, additional BOF heats were monitored using the flame drop method to determine their respective FTDC levels. These heats were monitored using the sensor system 10 shown in FIGS. 1–3. The PLC was programmed according to the flow diagram shown in FIG. 7, and the program analyzed the LI signals received from the light sensor 1 and the $O_2$ signals received from the oxygen source 2 to determine the X1, X2, and X3 values for the additional heats. Using the FTDC equation, the program then predicted the in-blow % carbon content based upon the previously calculated "a" through "k" values and the realtime X1, X2 and X3 values determined from the continuous LI, $DO_2$ and $DO_2$ kink measurements. Each predicted FTDC for the additional heats was later contrasted with an actual FTDC compositions determined in a laboratory through chemical analyses. It was found that the predicted values were very accurate. The mean absolute error for the predicted in-blow % carbon content values, based on the flame drop method, was found to be about 0.004% carbon, and the standard deviation of error was determined to be about 0.006% carbon. It was determined that the predictions were best suited for BOF heats having a carbon content range of about 0.05% carbon or lower because above the 0.05% carbon range accuracy of the FTDC predictions decrease.

Figure 4:
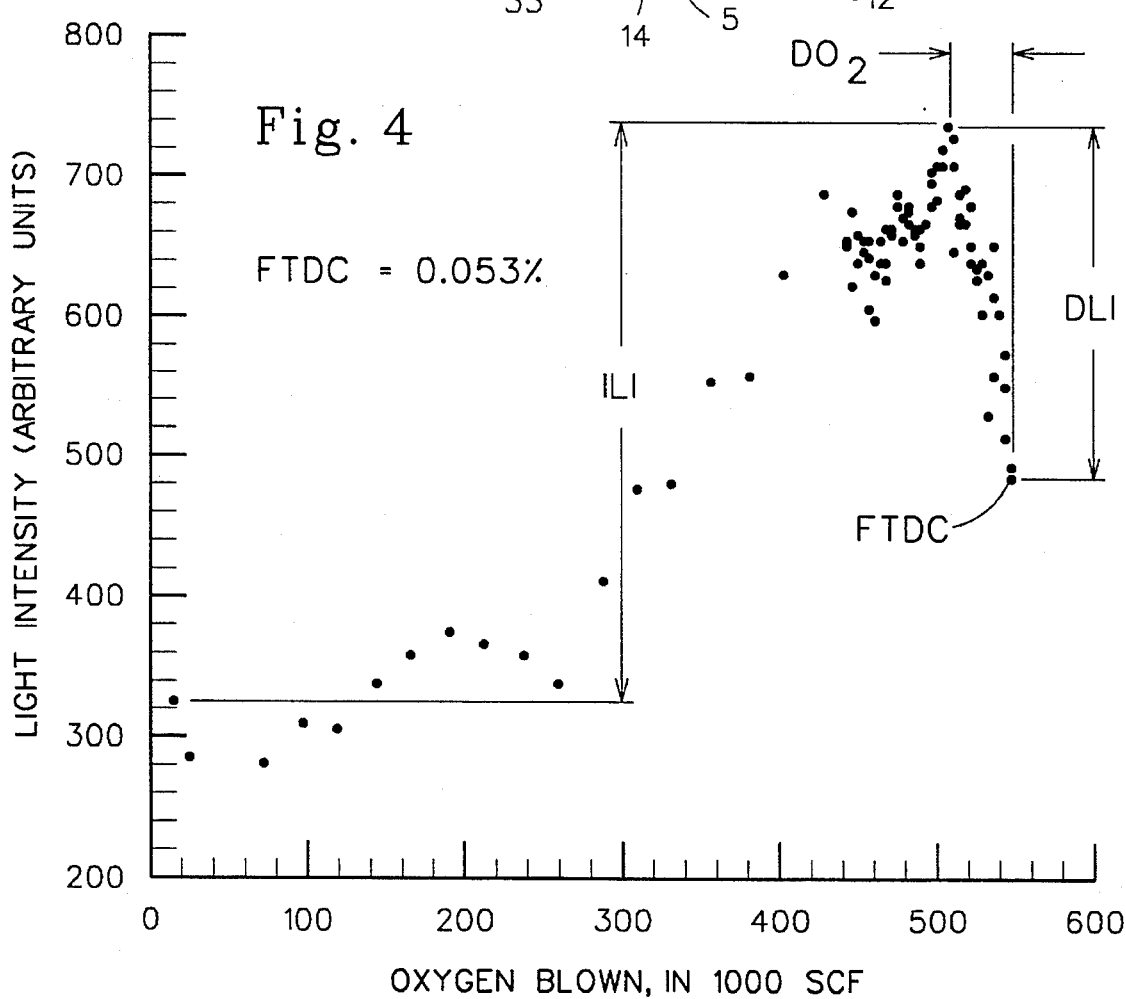
FIG. 4 is a graph showing a BOF heat having a 0.053% FTDC.
Figure 5:
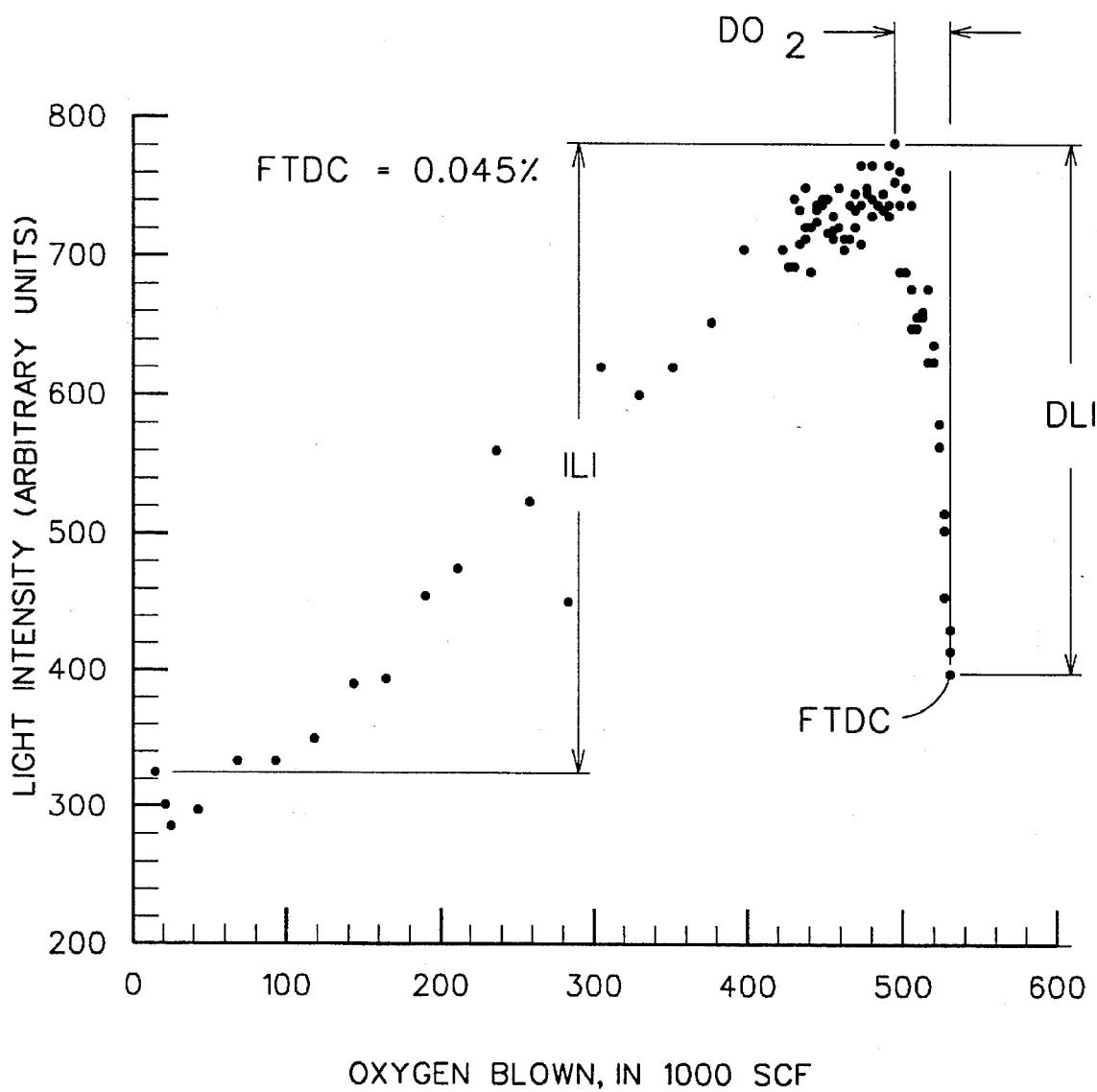
FIG. 5 is a graph showing a BOF heat having a 0.045% FTDC.

Referring to the BOF heat examples shown in the graphs of FIGS. 4 and 5, it can be seen that the light intensity emitted from a BOF increases steadily for approximately the first 80% of the in-blow before it reaches a point of maximum light intensity. The increase in light intensity tip to maximum LI is shown as (ILI). Realtime LI and $O_2$ signals are sent continuously to the PLC from the start of the blow until the end of the blow to plot a complete LI curve and to record total oxygen consumption. The time averaged LI signals are sent once every minute for the first 80% of the blow and once every 4 seconds during the last 20% of the blow. When the LI curve drops from its point of maximum light intensity, the PLC begins to continuously process the realtime LI and $O_2$ signals to determine in-blow carbon content. Again, the in-blow % carbon content is determined by running a computer program that calculates continuous realtime % carbon based upon an FTDC equation similar to the one disclosed. As the predicted % carbon falls to within a range of approximately 0.05% C or below, a continuous display showing the predicted % carbon is given to the operators until the end of the blow is reached. In the two curves plotted in FIGS. 4 and 5, the realtime $O_2$ and LI signals are relayed to the PLC for processing until the computer readout indicates that the % carbon in the steel bath has been reduced to the desired aim carbon level for the end product. The oxygen blow is then stopped, and the steel is poured into a ladle for further processing such as continuous casting into finished products.

Figure 6:
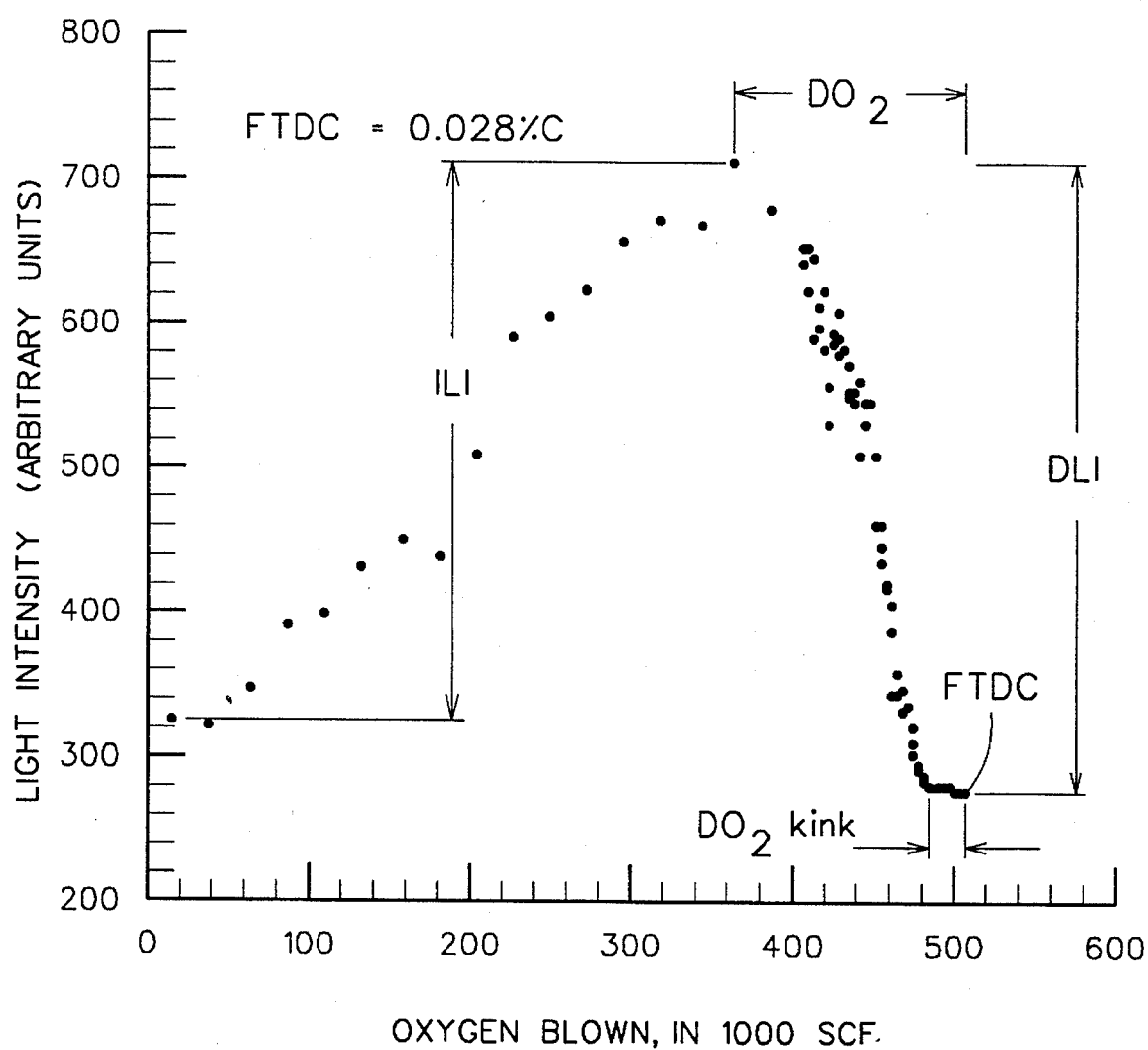
FIG. 6 is a graph showing a BOF heat having a 0.028% FTDC.

The third BOF heat example shown in FIG. 6, depicts a curve that continues past a "kink" in the LI measurements.

The kink in the LI curve is an indication of a smaller post combustion flame, and a lower visible light level at the mouth of the BOF vessel. Flame reduction and lower light intensity are a result of the oxygen blow reducing the excess carbon in the steel bath to a level where suddenly a somewhat constant flame, having a low light intensity level, is observed at the mouth of the BOF vessel because of the small amount of CO in the off-gas. Consequently, the steady low level of light intensity gives LI measurements that generate the kink in the LI curve shown in FIG. 6. Under such steady low light level conditions realtime $DO_2$kink values are determined continuously by the PLC along with the realtime $DO_2$ and LI values, and the computer continuously calculates in-blow % carbon content based upon DLI/ILI, $DO_2$ and $DO_2$kink as shown in the example below. When the program readout indicates that the % carbon in the steel bath is equal to the desired aim carbon content, the oxygen blow is discontinued and the steel is poured for further processing into finished products.

As seen in the three example curves plotted using the flame drop method, after the maximum LI point has been reached, the values for X1, X2 and X3 can be calculated continuously as the heat is being blown, and the in-blow % carbon content of the heat can be determined in realtime until the aim carbon is predicted by the PLC output. For example, in FIG. 4 a point of maximum LI is reached after about 500,000 SCF of $O_2$ is blown into the vessel. At the point of maximum LI, the light intensity drops from a high of approximately 730, and the oxygen blow continues until a metal composition of 0.053% carbon is reached. As the LI falls from its maximum level of 730, the PLC receives continuous realtime LI and $O_2$ signals from the sensor device 1 and the oxygen supply 2, and displays continuous in-blow % carbon content for the heat starting at about 0.05% carbon and below until the end of the oxygen blow is shut down. In this example the 0.053% carbon level is reached at a light intensity of about 480 corresponding to a $DO_2$ of approximately 45,000 SCF.

In FIG. 5 an LI curve for a low carbon BOF heat is shown having an FTDC of 0.045% carbon. A point of maximum LI is reached at about 780 at just under 500,000 SCF of oxygen, and the 0.045% carbon level is predicted at a light intensity of about 400 corresponding to a $DO_2$ of approximately 40,000 SCF. Once again, during the oxygen blow the LI and $O_2$ signals are continuously sent to the PLC, and the program calculates the X1, X2 and X3 values and continuously predicts the in-blow % carbon content.

Referring to FIG. 6, a BOF heat is shown having an FTDC of 0.028% carbon. In this example the oxygen is blown past the point of $DO_2$kink shown in the LI curve. As heretofore stated, the "kink" occurs at the stage of the steelmaking process where the excess carbon has been reduced by the oxygen to such a low carbon level that the small amount of CO in the off-gas suddenly produces a somewhat constant low light level flame as described above. Consequently, the dark post combustion flame at the mouth of the BOF vessel produces X2 variables that produce the "kink" in the LI curve.

Control of the oxygen blow is more critical through the $DO_2$kink portion of the heat. The PLC readout must be watched to prevent overblowing the heat and consuming excessive amounts of carbon. The heat shown in FIG. 6 reaches its point of maximum LI at about 710 at 360,000 SCF of oxygen. The LI intensity then drops until it reaches the "kink" at an LI measurement of about 280. The oxygen blow continues past the kink until the PLC indicates that a predicted steel composition of 0.028% carbon has been reached. In this example the FTDC of 0.028% is reached when DLI/ILI=1.05, $DO_2$=155,000 SCF, and $DO_2$kink=25,000 SCF.

While this invention has been described as having a preferred design and method for predicting in-blow % carbon content and -FTDC in a BOF heat, it is understood that it is capable of further modifications, uses, and/or adaptations following in general the principle of the invention and including such departures from the present disclosure as come within known or customary practice in the art to which the invention pertains, and as may be applied to the essential features set forth herein, that fall within the scope of the appended claims.

I claim:

1. A method of determining carbon content of a heat during an oxygen blow into a BOF vessel, comprising:
    a) measuring light intensity emitted from the BOF vessel including;
        i) measuring an (ILI) value indicative of an increase in light intensity emitted from the BOF vessel,
        ii) measuring a (DLI) value indicative of a decrease in light intensity emitted from the BOF vessel, and
        iii) calculating a DLI/ILI ratio;
    b) measuring an amount of oxygen blown into the BOF vessel;
    c) calculating in-blow % carbon content of the heat using said DLI/ILI ratio and said amount of oxygen blown;
    d) discontinuing the oxygen blow into the BOF vessel when an in-blow % carbon content equal to an aim carbon for the heat is calculated; and
    e) tapping the heat having said in-blown % carbon content calculated equal to said aim carbon for further processing into a finished steel product.

2. The method according to claim 1 wherein the step measuring said light intensity includes; a) measuring an increase in light intensity (ILI) between a start of the oxygen blow to a point of maximum light intensity emitted from the BOF vessel,
    b) measuring a decrease in light intensity (DLI), from said point of maximum light intensity, and
    c) calculating a DLI/ILI ratio for use in the step calculating said in-blow % carbon content of the heat based upon said light intensity and said amount of oxygen blown.

3. The method according to claim 2 wherein:
    a) the step measuring said decrease in light intensity (DLI) is continuous;
    the step calculating said DLI/ILI ratio is continuous; and
    c) the step calculating in-blow % carbon content of the heat is continuous.

4. The method according to claim 3 wherein said DLI/ILI ratio is calculated until the oxygen blow is discontinued.

5. The method according to claim 1 wherein the step measuring said amount of oxygen blown into the BOF vessel includes measuring continuously an amount of oxygen blown from a point of maximum light intensity emitted from the BOF vessel ($DO_2$), said $DO_2$ being used in the step calculating said in-blow % carbon content of the heat based upon said light intensity and said amount of oxygen blown.

6. The method according to claim 5 wherein said $DO_2$ is measured continuously until an aim carbon is calculated in the step calculating said in-blow % carbon content of the heat based upon said light intensity and said amount of oxygen blown.

7. The method according to claim 5 wherein said $DO_2$ is measured continuously until the oxygen blow is discontinued.

8. The method according to claim 5 including the further step of measuring an amount of oxygen blown from a kink in said light intensity measurements until the oxygen blow is discontinued ($DO_2$kink), said $DO_2$kink being used in the step calculating said in-blow % carbon content of the heat based upon said light intensity and said amount of oxygen blown.

9. A method of determining carbon content of a heat during an oxygen blow into a BOF vessel, comprising:
   a) measuring an increase in light intensity (ILI) emitted from the BOF vessel between a start of the oxygen blow and a point of maximum light intensity;
   b) measuring a difference in light intensity (DLI) at a point of any given time between said point of maximum light intensity and an end of the oxygen blow;
   c) measuring an amount of oxygen blown ($DO_2$) at said point of any given time between said point of maximum light intensity and said end of the oxygen blow;
   c) determining DLI/ILI variables from said DLI measurements and from said ILI measurements;
   d) determining $DO_2$ variables from said $DO_2$ measurements;
   d) calculating in-blow % carbon content of the heat based upon said DLI/ILI variables and said $DO_2$ variables;
   e) discontinuing the oxygen blow when an in-blow % carbon content equal to an aim carbon for the heat is calculated; and
   f) tapping the heat having said in-blown % carbon content calculated equal to said aim carbon for further processing into a finished steel product.

10. The method according to claim 9 including the further steps of:
    a) measuring an amount of oxygen blown at a point of any given time between a kink in said DLI measurements and said end of the oxygen blow ($DO_2$kink);
    b) determining $DO_2$kink variables from said $DO_2$kink measurements; and
    c) calculating in-blow % carbon content of the heat based upon said DLI/ILI variables, said $DO_2$ variables, and said $DO_2$kink variables.

11. The method according to claim 9 wherein said in-blow % carbon content is calculated continuously.

12. The method according to claim 10 wherein said in-blow % carbon content is calculated continuously.

13. A method of determining carbon content of a heat during an oxygen blow into a BOF vessel, comprising:
    a) providing at least one sensor to measure visible light intensity emitted from the BOF vessel (LI);
    b) measuring with said at least one sensor said LI between a start of the oxygen blow and a point of maximum LI, said at least one sensor generating at least two LI signals for use in a PLC to calculate at least one value indicative of an increase in light intensity (ILI);
    c) measuring with said at least one sensor continuous LI measurements between said point of maximum LI and an end of the oxygen blow, said at least one sensor generating continuous realtime LI signals for use in said PLC to calculate continuous realtime values for a decrease in light intensity (DLI);
    d) generating for use in said PLC continuous realtime $O_2$ signals indicative of an amount of oxygen blown between said point of maximum LI and said end of the oxygen blow ($DO_2$);
    e) predicting a continuous in-blow % carbon content of the heat based upon said at least one ILI value, said continuous realtime DLI values and said continuous realtime $DO_2$ amounts; and
    f) discontinuing the oxygen blow when an in-blow % carbon content predicted equal to an aim carbon; and
    g) tapping the heat having said in-blow % carbon content predicted equal to said aim carbon for further processing into a finished steel product.

14. The method according to claim 13 including the further step of generating for use in said PLC continuous realtime $O_2$ signals indicative of an amount of oxygen blown between a kink in said LI measurements and said end of the oxygen blow ($DO_2$kink).

15. The method according to claim 14 wherein said in-blow % carbon content is predicted based upon at least one ILI value, said continuous realtime DLI values, said continuous realtime $DO_2$ amounts and said continuous realtime $DO_2$kink amounts.

16. The method according to claim 13 wherein said in-blow % carbon content is calculated based upon a continuous realtime DLI/ILI ratio and said continuous realtime $DO_2$ amounts.

17. The method according to claim 15 wherein said in-blow % carbon content is calculated based upon said a continuous realtime DLI/ILI ratio, said continuous realtime $DO_2$ amounts and said continuous realtime $DO_2$kink amounts.

18. The method according to claim 13 including the further step of displaying continuous predicted in-blow % carbon content starting at a carbon range of about 0.05% and below.

19. Apparatus for determining in-blow % carbon content in a BOF vessel, comprising:
    a) means for generating a realtime signal indicative of the amount of oxygen blown into a BOF vessel;
    b) means for generating a realtime signal indicative of the visible light emitted from a BOF vessel during an oxygen blow; and
    c) means for calculating in-blow % carbon content of steel in the BOF vessel based upon:
       i) a DLI/ILI ratio where (DLI) is a value indicative of a decrease in said visible light and (ILI) is a value indicative of an increase in said visible light, and
       ii) a $DO_2$ value indicative of an amount of oxygen blown into the BOF vessel between said (DLI) value and said (ILI) value.

20. The apparatus of claim 19 including means for calculating in-blow % carbon content based upon:
    a) a DLI/ILI ratio comprising;
       i) at least one (ILI) value indicative of an increase in said visible light between a start of the oxygen blow to a point of maximum visible light intensity, and
       ii) continuous realtime (DLI) values indicative of a continuing decrease in said visible light between said point of maximum visible light intensity and an end of the oxygen blow; and
    b) continuous realtime $DO_2$ values indicative of an amount of oxygen blown between said point of maximum visible light intensity and said end of the oxygen blow.

21. The apparatus of claim 20 including means for calculating in-blow % carbon content based upon:
    a) a DLI/ILI ratio comprising;
       i) at least one (ILI) value indicative of an increase in said visible light between a start of the oxygen blow to a point of maximum visible light intensity, and
       ii) continuous realtime (DLI) values indicative of a continuing decrease in said visible light between said point of maximum visible light intensity and an end of the oxygen blow;

b) continuous realtime $DO_2$ values indicative of an amount of oxygen blown between said point of maximum visible light intensity and said end of the oxygen blow; and c) continuous realtime $DO_2kink$ values indicative of an amount of oxygen blown between a kink in said realtime signal indicative of the visible light emitted from a BOF vessel and said end of the oxygen blow.

22. Apparatus for determining carbon content of a heat during an oxygen blow into a BOF vessel comprising:

a) a light meter including;
  i) a housing having an interior space to accommodate a light sensor having means to generate signals indicative of visible light;
  ii) a cold air supply communicating with said interior space;
  iii) a sighting window extending through a wall of said housing to expose said light sensor to light emitted from the BOF vessel;
  iiii) an air wipe flowing at a velocity through said sighting window to prevent outside contaminates from entering said interior space;
  iiiii) an adjustment means to regulate said velocity of said air wipe;

b) means to measure and generate signals indicative of oxygen blown into the BOF vessel; and c) a PLC having means to calculate in-blow % carbon content based upon said oxygen blown signals and said visible light signals received from said light meter.

23. A light meter comprising:

a) a housing having an interior space to accommodate a light sensor capable of generating light intensity signals;

b) a cold air supply communicating with said interior space;

c) a sighting window extending through a wall of said housing to expose said light sensor to light emitted from the BOF vessel;

d) an air wipe flowing at a velocity through said sighting window to prevent outside contaminants from entering said interior space;

e) an adjustment means to regulate said velocity of said air wipe.

24. The apparatus of claim 23 wherein said air wipe encircles said light sensor.

25. The apparatus of claim 23 wherein said adjustment means is adjustable toward or away from said sighting window to regulate said velocity of said air wipe flowing through said sighting window.

26. The apparatus of claim 23 wherein said adjustment means comprises:

a) mounting plate slidably attached to a wall of said housing for movement toward or away from said sighting window;

b) a clamp attached to a first end of said mounting plate adjacent said sighting window, said clamp adapted to hold a light sensitive portion of said light sensor parallel to said sighting window; and c) a screw means attached to a second end of said mounting plate opposite said first end, said screw also attached to said housing to provide a force to move said mounting plate toward or away from said sighting window.

27. The apparatus of claim 23 including means to regulate the temperature of the cold air supply communicating with said interior space.

28. The method according to claim 3 wherein said DLI/ILI ratio is calculated until an aim carbon is calculated in the step calculating said in-blow % carbon content of the heat based upon said light intensity and said amount of oxygen blown.

* * * * *